(12) United States Patent
Okuma et al.

(10) Patent No.: US 12,504,297 B2
(45) Date of Patent: Dec. 23, 2025

(54) MAP RELIABILITY DETERMINATION APPARATUS AND DRIVING ASSISTANCE APPARATUS

(71) Applicant: Honda Motor Co., Ltd., Tokyo (JP)

(72) Inventors: Yuki Okuma, Wako (JP); Hayato Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 18/124,515

(22) Filed: Mar. 21, 2023

(65) Prior Publication Data

US 2023/0314166 A1 Oct. 5, 2023

(30) Foreign Application Priority Data

Mar. 31, 2022 (JP) ................. 2022-058120

(51) Int. Cl.
*G01C 21/00* (2006.01)
*B60W 50/14* (2020.01)

(52) U.S. Cl.
CPC ......... *G01C 21/3822* (2020.08); *B60W 50/14* (2013.01); *G01C 21/3848* (2020.08); *B60W 2050/146* (2013.01)

(58) Field of Classification Search
CPC .. G01C 21/3822; G01C 21/3848; G01C 7/04; G01C 21/28; B60W 50/14; B60W 2050/146; B60W 30/12; B60W 60/001; B60R 1/22; G01B 11/24; G06T 7/00; G06T 2207/30256; G08G 1/00; G09B 29/003; G09B 29/10; G06K 9/00798
See application file for complete search history.

(56) References Cited

U.S. PATENT DOCUMENTS

| 2014/0172221 A1* | 6/2014 | Solyom ................. B60W 30/12 701/23 |
| 2019/0293435 A1* | 9/2019 | Mori ...................... G08G 1/167 |
| 2020/0125860 A1* | 4/2020 | Hyun ........................ G06T 7/11 |
| 2022/0268587 A1* | 8/2022 | Konishi ............. G01C 21/3859 |

FOREIGN PATENT DOCUMENTS

JP 2019164005 A 9/2019

\* cited by examiner

*Primary Examiner* — Abby Lin
*Assistant Examiner* — Renee LaRose
(74) *Attorney, Agent, or Firm* — Duft & Bornsen, PC (57) ABSTRACT

A map reliability determination apparatus includes a microprocessor and a memory coupled to the microprocessor. The microprocessor is configured to perform: acquiring a traveling trajectory of a predetermined section on which a subject vehicle has traveled; recognizing, based on a map information around the subject vehicle, a pair of left and right lane boundary lines which defines a lane on which the subject vehicle has traveled in the predetermined section; calculating a deviation amount between the traveling trajectory acquired in the acquiring and the pair of left and right lane boundary lines recognized in the recognizing; determining a reliability of the pair of left and right lane boundary lines recognized in the recognizing based on the deviation amount calculated in the calculating; and outputting the reliability information including a determination result of the reliability in the determining.

10 Claims, 7 Drawing Sheets

MAP RELIABILITY DETERMINATION APPARATUS AND DRIVING ASSISTANCE APPARATUS

CROSS-REFERENCE TO RELATED APPLICATION

This application is based upon and claims the benefit of priority from Japanese Patent Application No. 2022-058120 filed on Mar. 31, 2022, the content of which is incorporated herein by reference.

BACKGROUND OF THE INVENTION

Field of the Invention

This invention relates to a map reliability determination apparatus configured to determine reliability of a road map information and a driving assistance apparatus.

Description of the Related Art

As this type of device, there has been conventionally known a device that detects a surrounding environment of a traveling vehicle by an in-vehicle sensor and generates map information on the basis of sensor data of the in-vehicle sensor (see, for example, JP 2019-164005 A).

However, a map generated as in the device described in JP 2019-164005 A may include an error, and it is preferable to give some index to a user in order to use such a map.

SUMMARY OF THE INVENTION

An aspect of the present invention is a map reliability determination apparatus including: a microprocessor and a memory coupled to the microprocessor. The microprocessor is configured to perform: acquiring a traveling trajectory of a predetermined section on which a subject vehicle has traveled; recognizing, based on a map information around the subject vehicle, a pair of left and right lane boundary lines which defines a lane on which the subject vehicle has traveled in the predetermined section; calculating a deviation amount between the traveling trajectory acquired in the acquiring and the pair of left and right lane boundary lines recognized in the recognizing; determining a reliability of the pair of left and right lane boundary lines recognized in the recognizing based on the deviation amount calculated in the calculating; and outputting the reliability information including a determination result of the reliability in the determining.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 7. A vehicle control system according to an embodiment of the present invention includes a map reliability determination apparatus and a driving assistance apparatus. The map reliability determination apparatus is configured to determine reliability of road map information. Further, the driving assistance apparatus is configured to perform driving assistance on the basis of the road map information whose reliability has been determined by the map reliability determination apparatus.

The vehicle control system can be applied to both a vehicle having a self-driving capability, that is, a self-driving vehicle, and a vehicle not having a self-driving capability, that is, a manually driven vehicle. Note that a vehicle to which the vehicle control system according to the present embodiment is applied may be referred to as a subject vehicle to be distinguished from other vehicles. Hereinafter, it is assumed that the subject vehicle is a self-driving vehicle. The self-driving vehicle has not only a self-driving capability but also a manual driving capability, and can be configured as a manually driven vehicle. That is, the subject vehicle (self-driving vehicle) can travel not only in a self-drive mode in which a driving operation by a driver is unnecessary, but also in a manual drive mode by the driving operation by the driver.

Figure 1:
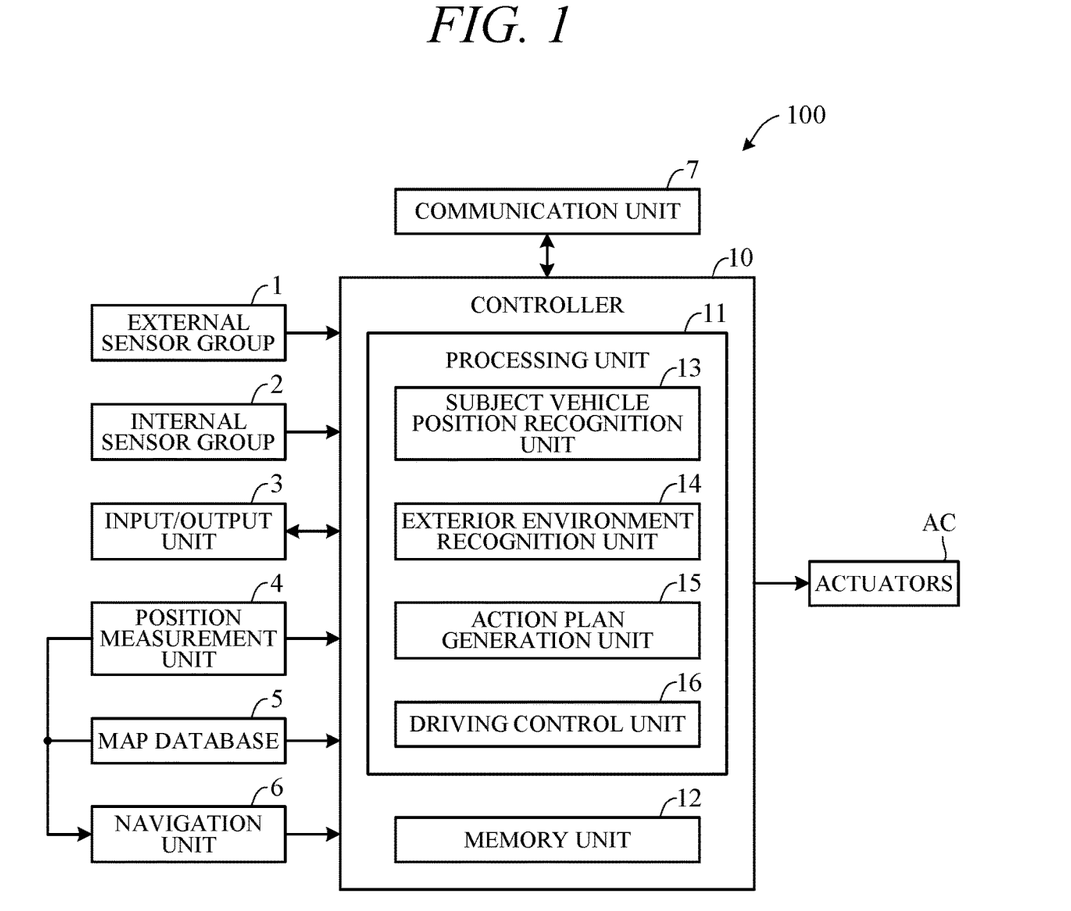
FIG. 1 is a block diagram schematically illustrating an overall configuration of a vehicle control system according to an embodiment of the present invention.

The subject vehicle may be any of an engine vehicle having an internal combustion engine (engine) as a traveling drive source, an electric vehicle having a traveling motor as a traveling drive source, and a hybrid vehicle having an engine and a traveling motor as traveling drive sources. FIG. 1 is a block diagram schematically illustrating an overall configuration of a vehicle control system 100 according to an embodiment of the present invention.

As illustrated in FIG. 1, the vehicle control system 100 mainly includes a controller 10, an external sensor group 1 communicably connected to the controller 10 via a CAN communication line or the like, an internal sensor group 2, an input/output device 3, a position measurement unit 4, a map database 5, a navigation unit 6, a communication unit 7, and actuators AC.

The external sensor group 1 is a generic term for a plurality of sensors (external sensors) that detect an external situation which is surrounding information of the subject vehicle. For example, the external sensor group 1 includes a LiDAR that detects a position (a distance or a direction from the subject vehicle) of an object around the subject vehicle by applying irradiation of laser light and detecting reflected light, a radar that detects a position of an object around the subject vehicle by applying irradiation of electromagnetic waves and detecting reflected waves, and a camera that has an imaging element such as a CCD or a CMOS and captures an image around the subject vehicle (forward, aft, and lateral).

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects acceleration in a front-rear direction and a left-right direction of the subject vehicle, a rotation speed sensor that detects a rotation speed of the traveling drive source, and the like. The internal sensor group 2 also includes a sensor that detects the driving operation of the driver in the manual drive mode, for example, operation of an accelerator pedal, operation of a brake pedal, operation of a steering wheel, and the like.

The input/output device 3 is a generic term for devices to which a command is input from the driver or information is output to the driver. For example, the input/output device 3 includes various switches to which the driver inputs various commands by operating an operation member, a microphone to which the driver inputs commands by voice, a display that provides information to the driver via a display image, a speaker that provides information to the driver by voice, and the like.

The position measurement unit (global navigation satellite system (GNSS) unit) 4 has a positioning sensor that receives a positioning signal transmitted from a positioning satellite. The positioning sensor can also be included in the internal sensor group 2. The positioning satellite is an artificial satellite such as a global positioning system (GPS) satellite or a quasi-zenith satellite. The position measurement unit 4 measures a current position (latitude, longitude, altitude) of the subject vehicle by using positioning information received by the positioning sensor.

The map database 5 is a device that stores general map information used for the navigation unit 6, and includes, for example, a hard disk or a semiconductor element. The map information includes road position information, information on a road shape (curvature or the like), and position information on intersections and branch points. The map information stored in the map database 5 is different from the highly accurate map information stored in the memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated based on the current position of the subject vehicle measured by the position measurement unit 4 and the map information stored in the map database 5. The current position of the subject vehicle can be measured using the detection values of the external sensor group 1, and the target route may be calculated based on the current position and the highly accurate map information stored in the memory unit 12.

The communication unit 7 communicates with various servers (not illustrated) via a network including a wireless communication network represented by the Internet network or a mobile phone network, and acquires map information, travel history information, traffic information, and the like from the server periodically or at an arbitrary timing. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated. It is also possible to communicate with other vehicles via the communication unit 7.

The actuators AC are traveling actuators for controlling traveling of the subject vehicle. In a case where the traveling drive source is an engine, the actuators AC include a throttle actuator that adjusts an opening (throttle opening) of a throttle valve of the engine. When the traveling drive source is a traveling motor, the traveling motor is included in the actuators AC. The actuators AC also include a brake actuator that operates a braking device of the subject vehicle and a steering actuator that drives the steering device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits (not illustrated) such as an I/O interface. Although a plurality of ECUs having different functions such as an engine control ECU, a traveling motor control ECU, and a braking device ECU can be separately provided, in FIG. 1, a controller 10 is illustrated as a set of these ECUs for convenience.

The memory unit 12 stores highly accurate road map information. The road map information includes road position information, information on a road shape (curvature or the like), information on a road gradient, position information on an intersection or a branch point, information on the number of lanes, a lane width and position information for each lane (information on a center position of lane and a boundary line of a lane position), position information on a landmark (traffic lights, signs, buildings, or the like) as a mark on a map, and information on a road surface profile such as unevenness of a road surface. The map information stored in the memory unit 12 includes map information acquired from the outside of the subject vehicle via the communication unit 7 and map information created by the subject vehicle itself using a detection value of the external sensor group 1 or detection values of the external sensor group 1 and the internal sensor group 2.

The processing unit 11 includes, as functional configurations, a subject vehicle position recognition unit 13, an exterior environment recognition unit 14, an action plan generation unit 15, and a driving control unit 16.

The subject vehicle position recognition unit 13 recognizes the position of the subject vehicle (subject vehicle position) on the map on the basis of the position information of the subject vehicle obtained by the position measurement unit 4 and the map information of the map database 5. The subject vehicle position may be recognized using the map information stored in the memory unit 12 and the surrounding information of the subject vehicle detected by the external sensor group 1, and thus the subject vehicle position can be recognized with high accuracy. When the subject vehicle position can be measured by a sensor installed on the road or outside the road side, the subject vehicle position can be recognized by communicating with the sensor via the communication unit 7.

The exterior environment recognition unit 14 recognizes an external situation around the subject vehicle on the basis of signals from the external sensor group 1 such as a LiDAR, a radar, and a camera. For example, a position, a speed, and an acceleration of a surrounding vehicle (a forward vehicle or a rearward vehicle) traveling around the subject vehicle, a position of a surrounding vehicle stopped or parked around the subject vehicle, and a position and a state of another object are recognized. Other objects include signs, traffic lights, signs such as division lines and stop lines on roads, buildings, guardrails, utility poles, signboards, pedestrians, bicycles, and the like. The states of other objects include a color of a traffic light (Red, Green, Yellow), a moving speed and a direction of a pedestrian or a bicycle, and the like.

The action plan generation unit 15 generates a driving path (target path) of the subject vehicle from the current point of time to a predetermined time ahead on the basis of, for example, the target route calculated by the navigation unit 6, the map information stored in the memory unit 12, the subject vehicle position recognized by the subject vehicle position recognition unit 13, and the external situation recognized by the exterior environment recognition unit 14. When there are a plurality of paths that are candidates for the target path on the target route, the action plan generation unit 15 selects, from among the plurality of paths, an optimal path that satisfies criteria such as compliance with laws and regulations and efficient and safe traveling, and sets the selected path as the target path. Then, the action plan generation unit 15 generates an action plan corresponding to the generated target path. The action plan generation unit 15 generates various action plans corresponding to overtaking travel for overtaking the preceding vehicle, lane change travel for changing a traveling lane, follow-up travel for following the preceding vehicle, lane keeping travel for maintaining the lane so as not to deviate from the traveling lane, deceleration travel, acceleration travel, or the like. When generating the target path, the action plan generation unit 15 first determines a travel mode and generates the target path based on the travel mode.

In the self-drive mode, the driving control unit 16 controls actuators AC so that the subject vehicle travels along the target path generated by the action plan generation unit 15. More specifically, the driving control unit 16 calculates a requested driving force for obtaining the target acceleration per unit time calculated by the action plan generation unit 15 in consideration of a travel resistance determined by the road gradient or the like in the self-drive mode. Then, for example, the actuators AC is feedback-controlled so that an actual acceleration detected by the internal sensor group 2 becomes the target acceleration. That is, the actuators AC is controlled such that the subject vehicle travels at a target vehicle speed and the target acceleration. When a drive mode is the manual drive mode, the driving control unit 16 controls actuators AC according to a travel command (steering operation or the like) from the driver acquired by the internal sensor group 2.

When the subject vehicle is traveling in the manual drive mode, the vehicle control system 100 configured as described above recognizes a boundary line (hereinafter, referred to as a lane boundary line) that defines a lane of a road on which the subject vehicle travels based on sensor values acquired by the external sensor group 1, generates road map information including the lane boundary line, and stores the generated road map information in the memory unit 12. When the subject vehicle travels in the self-drive mode, the vehicle control system 100 recognizes lane boundary lines on a right side and a left side of the subject vehicle based on the road map information stored in the memory unit 12, and controls the actuators AC so that the subject vehicle travels at the center between the left and right lane boundary lines.

Figure 2:
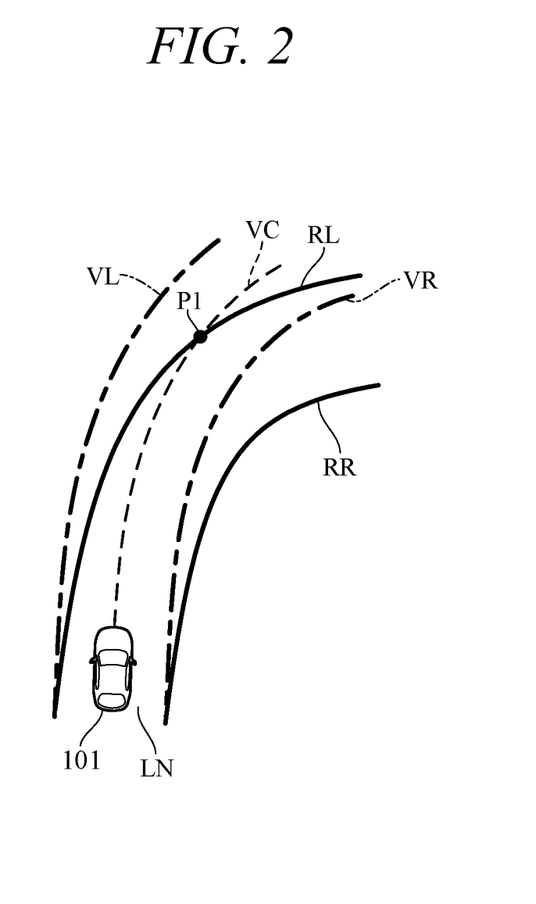
FIG. 2 is a diagram for explaining deviation of a lane boundary line.

By the way, when an error is included in the sensor value of the external sensor group 1 or when there is a change in a road structure, an actual position of the lane boundary line and a position of the lane boundary line indicated by the road map information may deviate from each other. FIG. 2 is a diagram for explaining deviation of the lane boundary line. In FIG. 2, solid lines RL and RR schematically represent actual boundary lines (hereinafter, may be referred to as an actual boundary line) that define a lane LN on which a subject vehicle 101 is traveling. The solid line RL represents the actual boundary line on the left side of the lane LN, and the solid line RR represents the actual boundary line on the right side of the lane LN. One-dot chain lines VL and VR schematically represent left and right boundary lines (hereinafter, may be referred to as a virtual boundary line) of the lane LN indicated by the road map information. In the example illustrated in FIG. 2, positions of the virtual boundary lines VL and VR in a vehicle width direction are gradually deviated to the left side with respect to the actual boundary lines RL and RR. At this time, when the target path for automatic traveling is generated based on a center line VC between the virtual boundary lines VL and VR, there is a possibility that a traveling position of the subject vehicle 101 deviates from the center of the lane or the subject vehicle 101 deviates from the outside of the road. In the example of FIG. 2, there is a possibility that the traveling position of the subject vehicle 101 gradually shifts to the left side in the lane LN and the subject vehicle 101 finally deviates from the road at a point P1. Therefore, in order to cope with such a problem, in the present embodiment, a map reliability determination apparatus is configured as follows.

Figure 3:
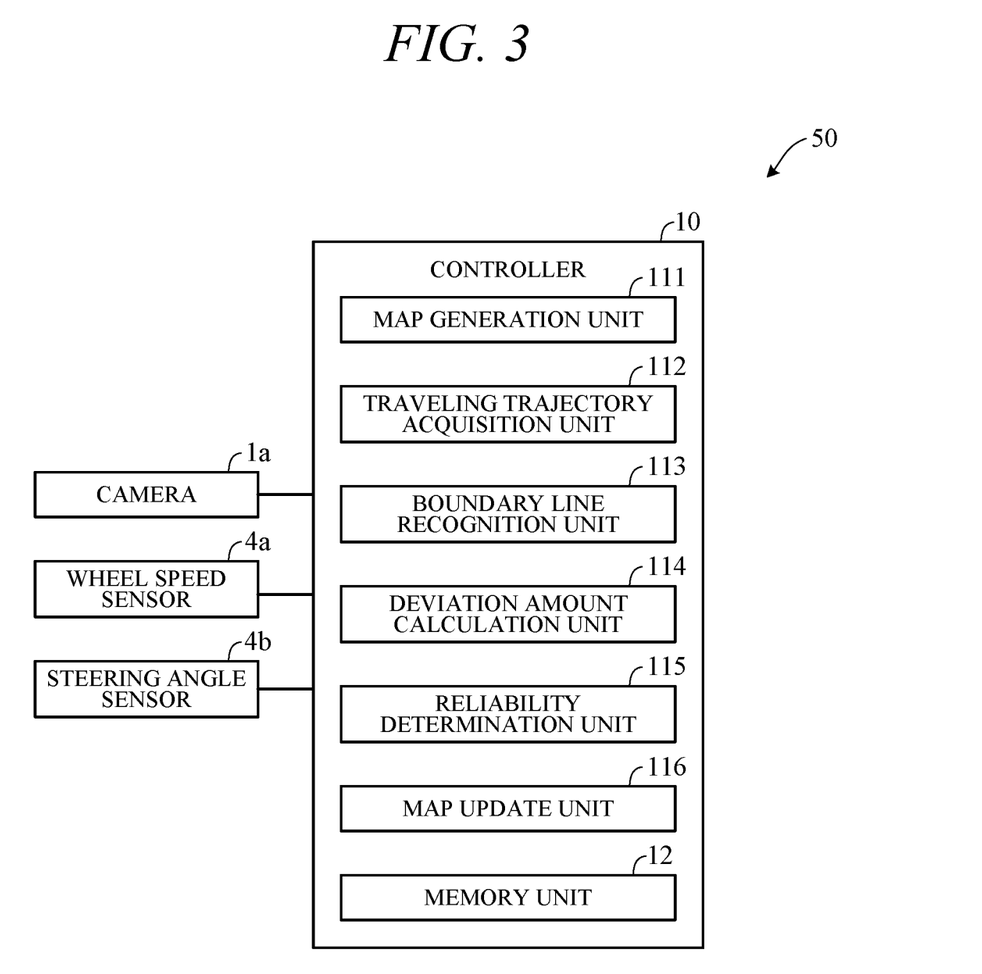
FIG. 3 is a block diagram illustrating a schematic configuration of a map reliability determination apparatus according to the embodiment of the present invention.

FIG. 3 is a block diagram illustrating a schematic configuration of a map reliability determination apparatus 50 according to the embodiment of the present invention, and illustrates a configuration when the subject vehicle 101 mainly travels in the manual drive mode. The map reliability determination apparatus 50 is included in the vehicle control system 100 of FIG. 1. As illustrated in FIG. 3, the map reliability determination apparatus 50 includes a camera 1a, a wheel speed sensor 4a, a steering angle sensor 4b, and the controller 10.

The camera 1a is a stereo camera having an imaging element (image sensor) such as a CCD or a CMOS, and constitutes a part of the external sensor group 1 in FIG. 1. The camera 1a may be a monocular camera. The camera 1a detects an external situation around the subject vehicle 101. The camera 1a is attached to a predetermined position in front of the subject vehicle 101, for example, and continuously images a space in front of the subject vehicle 101 to acquire an image (camera image) of an object. The object includes a boundary line (for example, the actual boundary lines RL and RR in FIG. 2) such as a division line that defines a lane on which the subject vehicle 101 travels.

The wheel speed sensor 4a detects a speed of a wheel included in the subject vehicle 101. The steering angle sensor 4b detects a steering angle of a wheel steered via a steering wheel.

The controller 10 of FIG. 3 includes a map generation unit 111 and the memory unit 12 as functional configurations.

The map generation unit 111 generates map information (environmental map) including three-dimensional point cloud data using the detection values detected by the camera 1a at the time of traveling in the manual drive mode. Specifically, an edge indicating an outline of an object is extracted from a camera image acquired by the camera 1a on the basis of luminance and color information for each pixel, and a feature point is extracted using the edge information. The feature point is, for example, an intersection of edges, and corresponds to a corner of a building, a corner of a road sign, an edge of a division line, or the like. The map generation unit 111 sequentially plots the extracted feature points on the environmental map, thereby generating an environmental map around the road on which the subject vehicle 101 has traveled. The map generation unit 111 recognizes a lane boundary line of a road on which the subject vehicle 101 travels based on the extracted feature points, and stores position information of the recognized lane boundary line in the environmental map. Note that, in a place where a division line is not provided, such as a road in a residential area or an intersection, a lane boundary line is recognized on the basis of recognition information of surroundings of the subject vehicle 101, such as outlines (edges) of buildings, curbs, plants, and the like arranged along the road, and travel routes of vehicles (preceding vehicles and oncoming vehicles) around the subject vehicle 101. The generated environmental map is stored in the memory unit 12.

The controller 10 of FIG. 3 further includes a traveling trajectory acquisition unit (hereinafter, simply referred to as a trajectory acquisition unit) 112, a boundary line recognition unit 113, a deviation amount calculation unit 114, a reliability determination unit 115, and a map update unit 116 as functional configurations.

The trajectory acquisition unit 112, the boundary line recognition unit 113, the deviation amount calculation unit 114, the reliability determination unit 115, and the map update unit 116 are configured to function as follows during advance traveling. The advance traveling is traveling in the manual drive mode performed to determine the reliability of the environmental map generated by the map generation unit 111 before traveling in the self-drive mode on the road on which the environmental map is generated by the map generation unit 111.

The trajectory acquisition unit 112 acquires a traveling trajectory of a target section on which the subject vehicle 101 has traveled. More specifically, the trajectory acquisition unit 112 calculates and acquires the traveling trajectory based on the position (time-series position) of the subject vehicle 101 measured by the position measurement unit 4 while the subject vehicle 101 is traveling in the target section. The target section is a section from the current traveling position of the subject vehicle 101 to a position behind the current traveling position by a predetermined distance, and the sensor data of the position measurement unit 4 acquired while the subject vehicle 101 is traveling in the target section is stored in the memory unit 12 at least until the calculation of the traveling trajectory of the target section by the trajectory acquisition unit 112 is completed. The traveling trajectory may be calculated based on sensor data of the wheel speed sensor 4a and the steering angle sensor 4b.

The boundary line recognition unit 113 recognizes a pair of left and right boundary lines defining a lane in the target section on which the subject vehicle 101 has traveled, based on the environmental map stored in the memory unit 12. More specifically, the boundary line recognition unit 113 acquires, from the environmental map, position information of a pair of left and right boundary lines that define the lane on which the subject vehicle 101 has traveled.

The deviation amount calculation unit 114 calculates a deviation amount between the traveling trajectory of the subject vehicle 101 acquired by the trajectory acquisition unit 112 and the pair of left and right lane boundary lines recognized by the boundary line recognition unit 113. The deviation amount is a distance between the traveling trajectory of the subject vehicle 101 and the center line (line VC in FIG. 2) between the pair of left and right lane boundary lines. The deviation amount calculation unit 114 sets calculation points on the traveling trajectory of the subject vehicle 101 at regular intervals, and calculates the deviation amount at each calculation point.

The reliability determination unit 115 determines the reliability of the pair of left and right lane boundary lines recognized by the boundary line recognition unit 113 on the basis of the deviation amount calculated by the deviation amount calculation unit 114. Specifically, the reliability determination unit 115 determines the reliability such that the smaller the deviation amount calculated by the deviation amount calculation unit 114, the higher the reliability. More specifically, the reliability determination unit 115 calculates the maximum value of the deviation amount of each calculation point set in the target section, and determines the reliability of the target section so that the smaller the maximum value, the higher the deviation amount. Note that the reliability determination unit 115 may determine the reliability using other statistical values such as a total value and an average value of the deviation amounts instead of the maximum value of the deviation amounts.

The map update unit 116 outputs reliability information including the determination result of the reliability determination unit 115 to the memory unit 12. Specifically, the reliability information is associated with the position information of the target section and stored in the environmental map stored in the memory unit 12. When the reliability information of the target section is already included in the environmental map, the reliability information of the target section included in the environmental map is updated (overwritten). The position information of the target section is information indicating the latitude and longitude of a start point and an end point of the target section. Note that the position information of the target section may be other information as long as the information can specify the position of the target section.

Further, the map update unit 116 corrects the environmental map stored in the memory unit 12 when the deviation amount calculated by the deviation amount calculation unit 114 is a predetermined amount or more. Specifically, when the deviation amount calculated by the deviation amount calculation unit 114 is ½ or more of the lane width, the map update unit 116 determines that the center line between the pair of left and right lane boundary lines recognized by the boundary line recognition unit 113 protrudes outside the actual lane, and corrects the environmental map stored in the memory unit 12. More specifically, the map update unit 116 corrects the position information of the lane boundary lines (the pair of left and right lane boundary lines) of the target section stored in the environmental map such that the center line between the lane boundary lines overlaps the traveling trajectory of the target section of the subject vehicle 101.

Figure 4:
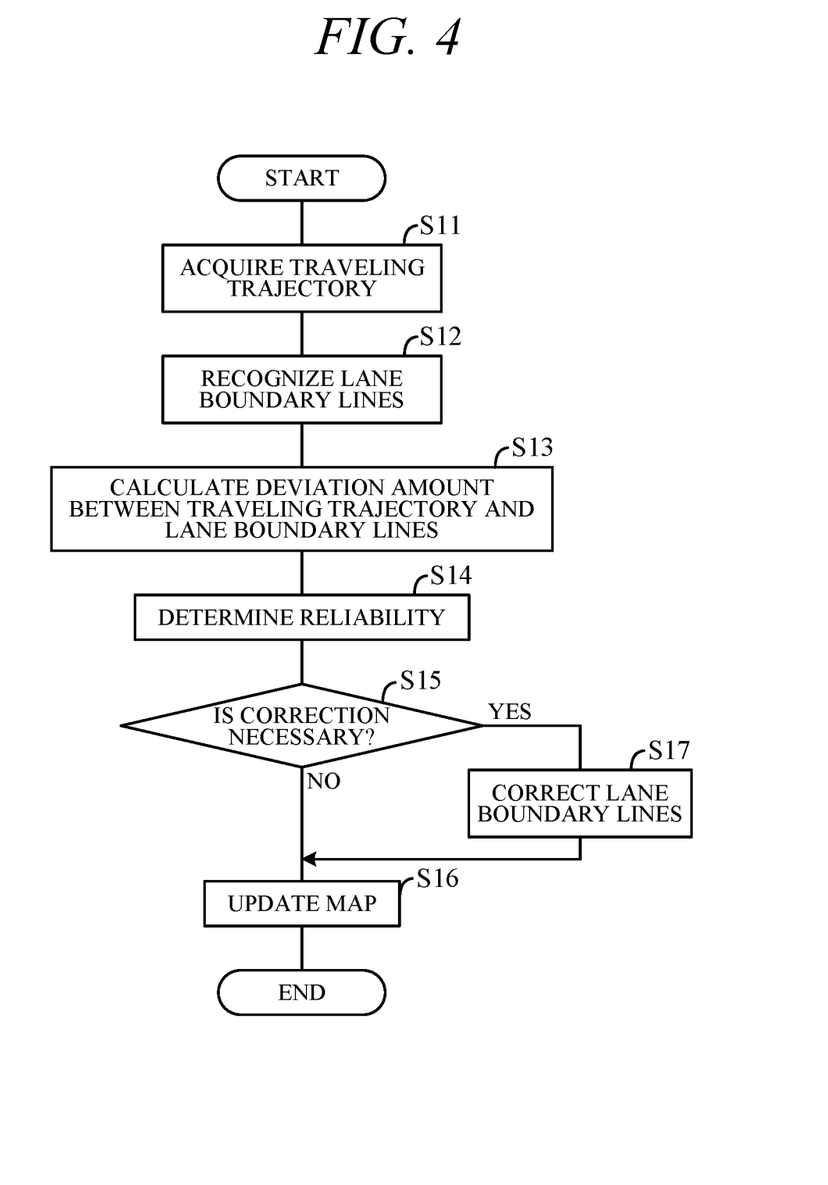
FIG. 4 is a flowchart illustrating an example of processing executed by the controller of FIG. 3.

FIG. 4 is a flowchart illustrating an example of processing executed by the controller 10 of FIG. 3 according to a predetermined program. The processing illustrated in the flowchart is started, for example, when the subject vehicle 101 travels in advance in the manual drive mode, and is repeated at a predetermined cycle.

In Step S11, the traveling trajectory of the target section on which the subject vehicle 101 has traveled is acquired. In Step S12, based on the environmental map stored in the memory unit 12, the pair of left and right lane boundary lines defining the lane in the target section on which the subject vehicle 101 has traveled is recognized. In Step S13, the deviation amount between the traveling trajectory acquired in Step S11 and the center line between the pair of left and right lane boundary lines recognized in Step S12 is calculated. In Step S14, the reliability of the pair of left and right lane boundary lines recognized in Step S12 is determined on the basis of the deviation amount calculated in Step S13. In Step S15, it is determined whether the lane boundary lines need to be corrected. More specifically, it is determined whether or not the center line between the pair of left and right lane boundary lines recognized in Step S12 protrudes outside the actual lane on the basis of the deviation amount calculated in Step S13. When the determination in Step S15 is negative, the environmental map is updated in Step S16, and the processing ends. Specifically, the reliability information including the determination result of Step S13 is stored in the environmental map of the memory unit 12 in association with the position information of the target section. When the determination in Step S15 is affirmative, the lane boundary lines on the environmental map are regenerated in Step S17. Specifically, the position information of the lane boundary lines of the target section is corrected based on the traveling trajectory acquired in Step S11. At this time, information indicating that the position information has been corrected may be stored in the environmental map of the memory unit 12 in association with the position information of the lane boundary line of the target section.

Figure 5A:
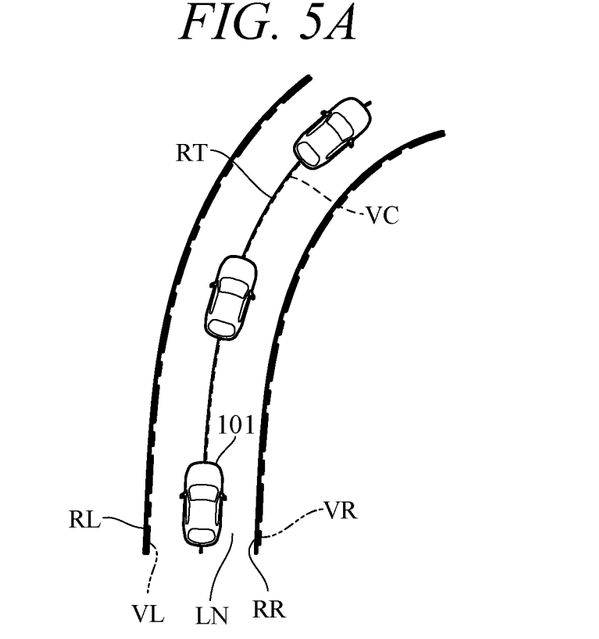
FIG. 5A is a diagram for describing a reliability of the lane boundary line.
Figure 5B:
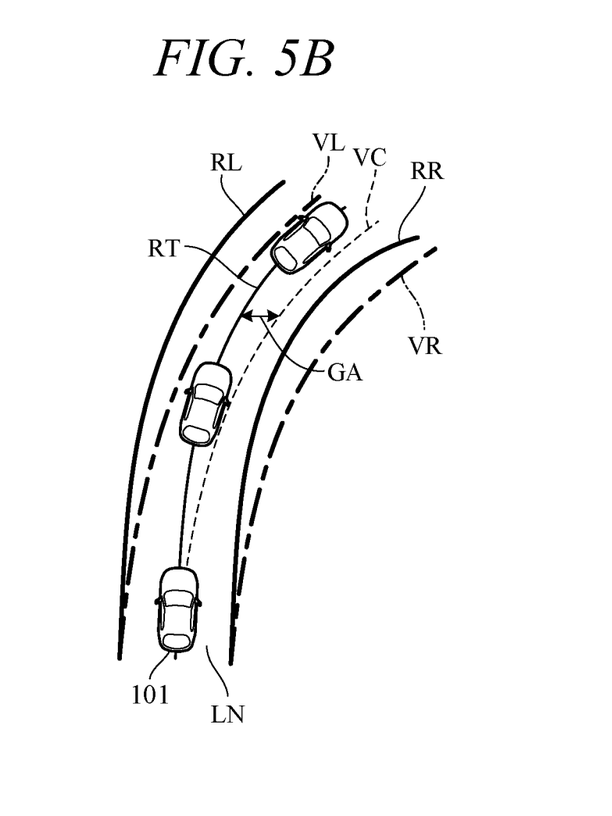
FIG. 5B is a diagram for describing the reliability of the lane boundary line.
Figure 5C:
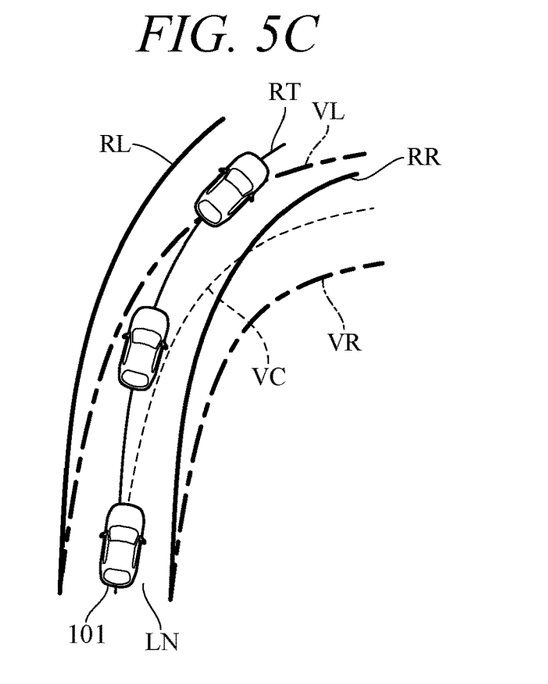
FIG. 5C is a diagram illustrating an example of the lane boundary line that needs to be corrected.

Here, the determination of the reliability of the lane boundary line will be described. FIGS. 5A and 5B are diagrams for describing the reliability of the lane boundary line. In FIG. 5A, the position of the traveling trajectory RT of the target section acquired in Step S11 substantially coincides with the position of the center line VC between the pair of left and right lane boundary lines (virtual boundary lines VL and VR) of the target section recognized in Step S12. In this case, it is determined that the reliability of the virtual boundary lines VL and VR is high, that is, automatic traveling in this target section is possible (Step S14). In FIG. 5B, the position of the center line VC between the virtual boundary lines VL and VR gradually approaches the actual boundary line RR on the right side. In this case, it is determined that the reliability of the virtual boundary lines VL and VR is low, that is, it is necessary to lower the self-driving level before entering the target section, more specifically, it is necessary to make a hands-on request to the occupant (Step S14). FIG. 5C is a diagram illustrating an example of the lane boundary line (virtual boundary line) that needs to be corrected. In FIG. 5C, the center line VC between the virtual boundary lines VL and VR protrudes to the right of the actual lane. In this case, it is determined that the position information of the lane boundary line stored in the environmental map needs to be corrected (Step S15). Instead of determining the reliability in two stages of "high" and "low", the reliability may be determined in three or more stages according to the length of the distance (distance GA in FIG. 5B) between the traveling trajectory RT and the center line VC between the virtual boundary lines VL and VR.

Figure 6:
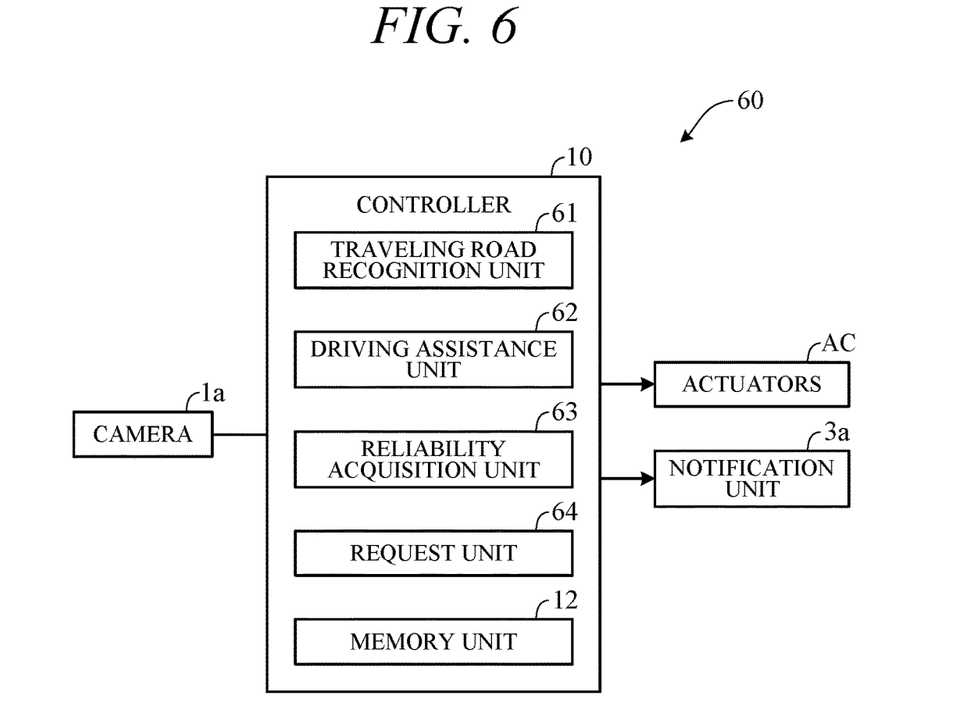
FIG. 6 is a block diagram illustrating a schematic configuration of a driving assistance apparatus according to an embodiment of the present invention.

FIG. 6 is a block diagram illustrating a schematic configuration of a driving assistance apparatus 60 according to an embodiment of the present invention, and illustrates a configuration in a case where driving assistance is performed on the basis of the environmental map of which the reliability has been determined by the map reliability determination apparatus 50. The driving assistance apparatus 60 is included in vehicle control system 100 in FIG. 1. As illustrated in FIG. 6, driving assistance apparatus 60 includes the camera 1a, the controller 10, the actuators AC, and a notification unit 3a. Although not illustrated, signals from the external sensor group 1, the internal sensor group 2, and the like are input to the controller 10 (see FIG. 1).

The notification unit 3a is a part of the input/output device 3 in FIG. 1, and includes a display that notifies the driver of information by display, a speaker that notifies the driver of information by voice, and the like. The controller 10 of FIG. 6 includes, as functional configurations, a traveling road recognition unit 61, a driving assistance unit 62, a reliability acquisition unit 63, a request unit 64, and the memory unit 12.

The traveling road recognition unit 61 recognizes a traveling road ahead in the traveling direction of the subject vehicle 101 during traveling. Specifically, based on the camera image in front of the subject vehicle acquired by the camera 1a, the traveling road recognition unit 61 recognizes the pair of left and right division lines that define the lane on which the subject vehicle 101 is traveling as the lane boundary lines. When the subject vehicle 101 is traveling on a road on which no division line is provided, the traveling road recognition unit 61 recognizes the pair of left and right lane boundary lines on the basis of recognition information of an object (surrounding vehicles, buildings arranged along a road, and the like) around the subject vehicle. The traveling road recognition unit 61 recognizes a region sandwiched between the recognized pair of left and right lane boundary lines as the traveling road of the subject vehicle 101. Note that the traveling road recognition unit 61 may recognize the traveling road of the subject vehicle 101 on the basis of information acquired by a radar or a LiDAR together with the camera image.

The driving assistance unit 62 provides driving assistance for the subject vehicle 101 based on the target route calculated by the navigation unit 6 and the environmental map (learning map) stored in the memory unit 12. At this time, the driving assistance unit 62 controls the actuators AC so that the subject vehicle 101 travels at the center of the traveling road (on the center line between the pair of left and right lane boundary lines) recognized by the traveling road recognition unit 61.

The reliability acquisition unit 63 acquires reliability information corresponding to the traveling road recognized by the traveling road recognition unit 61 from the learning map stored in the memory unit 12. Specifically, the reliability acquisition unit 63 acquires reliability information corresponding to a section from the current position of the subject vehicle 101 to a position separated by a certain distance in the traveling direction from the environmental map stored in the memory unit 12. The certain distance is a distance at which the takeover of the driving operation to the occupant can be performed with sufficient time, and is determined on the basis of the current traveling speed of the subject vehicle 101.

The request unit 64 outputs request information including a take-over request to the occupant via the notification unit 3a based on the reliability indicated by the reliability information acquired by the reliability acquisition unit 63. Specifically, when the reliability is less than a predetermined degree, the request unit 64 determines that there is a possibility that the traveling position of the subject vehicle 101 deviates from the center of the lane or the subject vehicle 101 deviates from the road when the subject vehicle 101 travels on the traveling road recognized by the traveling road recognition unit 61, and outputs request information to request a driving-mode switch to the occupant. The request information includes image information to be displayed on the notification unit 3a (display), specifically, image information for prompting the occupant to operate the steering wheel (hands on), and image information for giving notice or notifying switching to the manual drive mode. Note that the request information may include voice information to be output to the notification unit 3a (speaker), specifically, voice information for prompting the occupant to turn on the hands or voice information for giving notice and notification of switching to the manual drive mode.

Figure 7:
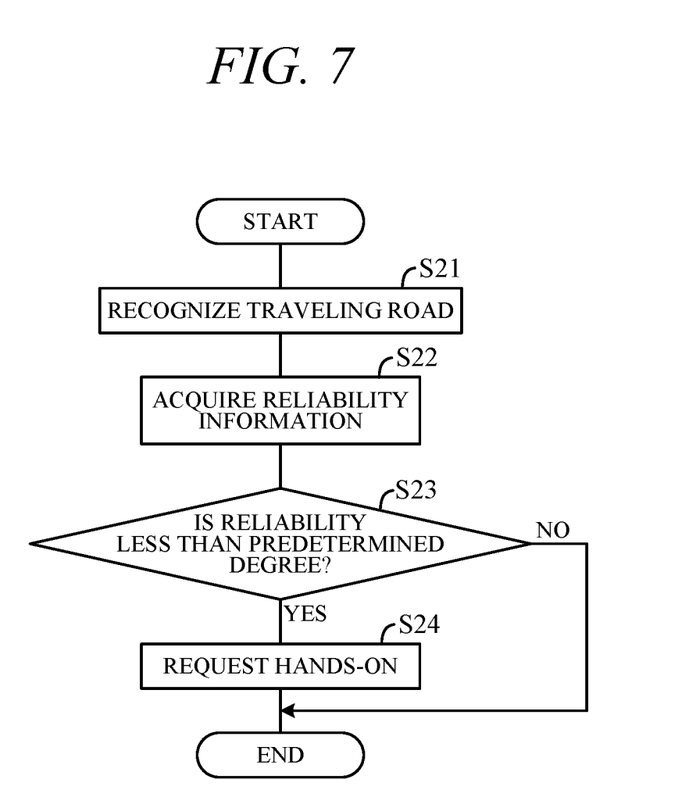
FIG. 7 is a flowchart illustrating an example of processing executed by the controller of FIG. 6.

FIG. 7 is a flowchart illustrating an example of processing executed by the controller 10 of FIG. 6 according to a predetermined program. The processing illustrated in the flowchart is started, for example, when the subject vehicle 101 travels in the self-drive mode, and is repeated at a predetermined cycle.

First, in Step S21, a traveling road ahead of the subject vehicle 101 in the traveling direction is recognized. In Step S22, reliability information corresponding to the traveling road recognized in Step S21 is acquired from the learning map stored in the memory unit 12. In Step S23, it is determined whether or not the reliability indicated by the reliability information acquired in Step S22 is less than a predetermined degree. When the determination in Step S23 is negative, the processing ends. When the determination in Step S23 is affirmative, request information is output in Step S24 to request the occupant to switch the drive mode. Note that the content of the request information may be made different on the basis of the level of the reliability. For example, request information for requesting only the hands-on to the occupant may be output.

According to the present embodiment, the following operational effects can be achieved.

(1) The map reliability determination apparatus 50 includes the trajectory acquisition unit 112 that acquires the traveling trajectory of the predetermined section (target section) on which the subject vehicle 101 has traveled, the boundary line recognition unit 113 that recognizes, on the basis of the map information around the subject vehicle 101, the pair of left and right lane boundary lines that defines the lane on which the subject vehicle 101 has traveled in the predetermined section, the deviation amount calculation unit 114 that calculates the deviation amount between the traveling trajectory acquired by the trajectory acquisition unit 112 and the pair of left and right lane boundary lines recognized by the boundary line recognition unit 113, the reliability determination unit 115 that determines reliability of the pair of left and right lane boundary lines recognized by the boundary line recognition unit 113 on the basis of the deviation amount calculated by the deviation amount calculation unit 114, and the map update unit 116 that outputs the reliability information including the determination result of the reliability determination unit 115. As a result, it is possible to provide a user with an index for evaluating the reliability of the map, and it is possible to appropriately determine whether or not automatic traveling using the map is possible.

(2) The map reliability determination apparatus 50 further includes the camera 1a that detects the external situation around the subject vehicle 101, the map generation unit 111 that generates map information (environmental map) around the subject vehicle 101 on the basis of information on the external situation detected by the camera 1a, and the memory unit 12 that stores the map information generated by the map generation unit 111. The map update unit 116 stores the reliability information including the determination result of the reliability determination unit 115 in the map information stored in the memory unit 12 in association with the position information of the predetermined section. As a result, it is possible to provide the user with an index for evaluating the reliability of the learning map (environmental map), and it is possible to appropriately determine whether or not automatic traveling using the learning map is possible.

(3) The map update unit 116 further corrects the map information stored in the memory unit 12 when the deviation amount calculated by the deviation amount calculation unit 114 is a predetermined amount or more. As a result, the position of the lane boundary line on the map is corrected so as to correspond to the actual lane boundary line, and the reliability of the map can be improved.

(4) The driving assistance apparatus 60 includes the above-described map reliability determination apparatus 50, the traveling road recognition unit 61 that recognizes a traveling road ahead in the traveling direction of the subject vehicle 101 traveling in the self-drive mode, the reliability acquisition unit 63 that acquires reliability information indicating the reliability of the lane boundary line of the traveling road recognized by the traveling road recognition unit 61, the reliability information being output by the map update unit 116 of the map reliability determination apparatus 50, and the request unit 64 that outputs request information including a take-over request to the occupant based on the reliability indicated by the reliability information acquired by the reliability acquisition unit 63. The request unit 64 outputs the request information when the reliability indicated by the reliability information acquired by the reliability acquisition unit 63 is less than a predetermined degree. As a result, the take-over request to the occupant can be appropriately made during the automatic traveling using the map. Thereby, the safety of traffic on the road on which the self-driving vehicle travels can be improved.

The above embodiment can be modified into various forms. Some modifications will be described below. In the above embodiment, the external situation around the subject vehicle 101 is detected by the camera 1a. However, the external situation may be detected using a LiDAR or the like, and the configuration of the external detection unit is not limited to the above-described configuration. In the above embodiment, the map generation unit 111 generates the environmental map at the time of traveling in the manual drive mode. However, the environmental map may be generated at the time of traveling in the self-drive mode. In the above embodiment, the map generation unit 111 generates the environmental map on the basis of the camera image. However, instead of the camera 1a, feature points of objects around the subject vehicle 101 may be extracted using data acquired by a radar or a LiDAR, and the environmental map may be generated. The configuration of the map generation unit is not limited to that described above.

In the above embodiment, the map update unit 116 as an output unit outputs (stores) the reliability information including the determination result of the reliability determination unit 115 to the map information stored in the memory unit 12, but the configuration of the output unit is not limited thereto. The output unit may output the map information including the reliability information stored in the memory unit 12 to a display (a display unit (not illustrated) of the input/output device 3 or the navigation unit 6). For example, the output unit may cause a display to display map information on which reliability information is superimposed. Specifically, the roads of the sections associated with the reliability information may be displayed in different colors according to the reliability indicated by the reliability information. Furthermore, the output unit may output, to the navigation unit 6, information (position information or the like) of a section with low reliability, for example, a section with reliability less than a predetermined degree. More specifically, when the navigation unit 6 searches for a target route to a destination input by the driver, the output unit may output a search instruction to the navigation unit 6 together with information on a section with low reliability such that a target route including a section with low reliability is preferentially searched for. Furthermore, the output unit may cause the display to display information for prompting the user to travel the preferentially searched target route in the manual drive mode. As a result, the lane boundary line in the section with low reliability is regenerated, and the reliability of the map can be further improved.

In the above embodiment, the map update unit 116 as a correction unit corrects the environmental map stored in the memory unit 12 when the deviation amount calculated by the deviation amount calculation unit 114 is a predetermined amount, more specifically, ½ or more of the lane width. However, a value other than ½ of the lane width may be set as the predetermined amount used for determining whether or not to correct the environmental map according to the accuracy required for the environmental map or the like.

In the above embodiment, the example has been described in which the advance traveling for determining the reliability of the environmental map generated by the map generation unit 111 is performed in the manual drive mode. However, in a case where the subject vehicle 101 has a self-driving capability capable of autonomously traveling while recognizing the traveling road on the basis of the camera image, the advance traveling may be performed in the self-drive mode.

Furthermore, in the above-described embodiment, the example in which the vehicle control system 100 (map reliability determination apparatus 50) includes the map generation unit 111 has been described, but the vehicle control system may not include the map generation unit. In this case, the vehicle control system may share the environmental map with the vehicle control systems of other vehicles having the map generation unit, and determine the reliability of the environmental map generated by the other vehicle. In addition, the vehicle control system may assist driving on the basis of the environmental maps generated by other vehicles.

Furthermore, in the above embodiment, the example in which the vehicle control system 100 functions as the map reliability determination apparatus 50 and the driving assistance apparatus 60 has been described, but the vehicle control system 100 may have only the function as the map reliability determination apparatus 50. In this case, the information obtained by the map reliability determination apparatus 50 may be shared with a vehicle control system of another vehicle, and driving may be supported on the other vehicle side using the information from the map reliability determination apparatus 50.

The above embodiment can be combined as desired with one or more of the above modifications. The modifications can also be combined with one another.

According to the present invention, it is possible to provide the user with the index for using the map.

Above, while the present invention has been described with reference to the preferred embodiments thereof, it will be understood, by those skilled in the art, that various changes and modifications may be made thereto without departing from the scope of the appended claims.

What is claimed is:

1. A driving assistance apparatus including a map reliability determination apparatus, wherein the map reliability determination apparatus comprises:
an external detection sensor configured to detect an external situation around a subject vehicle; and
a microprocessor and a memory coupled to the microprocessor, wherein
the microprocessor is configured to perform:
acquiring a traveling trajectory of a predetermined section on which the subject vehicle has traveled;
generating, based on the external situation detected by the external detection sensor, an environmental map including a pair of left and right lane boundary lines around the subject vehicle to store the environmental map into the memory,
recognizing, based on the environmental map stored in the memory, the pair of left and right lane boundary lines which define a lane on which the subject vehicle has traveled in the predetermined section;
calculating a deviation amount between the traveling trajectory and the pair of left and right lane boundary lines;
determining, after calculating the deviation amount, a reliability of the environmental map including the pair of left and right lane boundary lines based on the deviation amount; and
outputting reliability information including a determination result of the reliability determined based on the deviation amount, wherein
the microprocessor is configured to further perform correcting the environmental map stored in the memory when the deviation amount is equal to or greater than a predetermined amount or when the reliability is less than a predetermined degree, and wherein
the driving assistance apparatus comprises:
the microprocessor configured to further perform:
recognizing a traveling road ahead in a traveling direction of the subject vehicle traveling in self-drive mode;
acquiring the reliability information indicating the reliability of the environmental map including the pair of left and right lane boundary lines of the traveling road, which is output by the map reliability determination apparatus; and
outputting request information including a take-over request to an occupant based on the reliability indicated by the reliability information.

2. The driving assistance apparatus according to claim 1, wherein
the traveling trajectory is a travel trajectory in a case where the subject vehicle travels again through a point included in the environmental map stored in the memory, and in a case where the subject vehicle travels in manual drive mode.

3. The driving assistance apparatus according to claim 1, wherein
the microprocessor is configured to perform
outputting the environmental map stored in the memory to a display by superimposing the reliability information including the determination result of the reliability.

4. A driving assistance apparatus according to claim 1, wherein
the microprocessor is configured to perform
the outputting of the request information including outputting the request information when the reliability indicated by the reliability information is less than a predetermined degree.

5. A driving assistance apparatus including a map reliability determination apparatus, wherein the map reliability determination apparatus comprises:

an external detection sensor configured to detect an external situation around a subject vehicle; and a microprocessor and a memory coupled to the microprocessor, wherein the microprocessor is configured to function as:

a trajectory acquisition unit configured to acquire a traveling trajectory of a predetermined section on which the subject vehicle has traveled;

a map generation unit configured to generate, based on the external situation detected by the external detection sensor, an environmental map including a pair of left and right lane boundary lines around the subject vehicle to store the environmental map into the memory, a recognition unit configured to recognize, based on the environmental map stored in the memory, the pair of left and right lane boundary lines which define a lane on which the subject vehicle has traveled in the predetermined section;

a calculation unit configured to calculate a deviation amount between the traveling trajectory acquired by the trajectory acquisition unit and the pair of left and right lane boundary lines recognized by the recognition unit;

a reliability determination unit configured to determine, after the deviation amount is calculated by the calculation unit, a reliability of the pair of left and right lane boundary lines recognized by the recognition unit based on the deviation amount calculated by the calculation unit; and an output unit configured to output reliability information including a determination result of the reliability determined based on the deviation amount by the reliability determination unit, wherein the microprocessor is configured to further function as a correction unit configured to correct the environmental map stored in the memory when the deviation amount calculated by the calculation unit is equal to or greater than a predetermined amount or when the reliability determined by the reliability determination unit is less than a predetermined degree, and wherein the driving assistance apparatus comprises:

the microprocessor configured to further function as:

a traveling road recognition unit configured to recognize a traveling road ahead in a traveling direction of the subject vehicle traveling in self-drive mode;

a reliability acquisition unit configured to acquire the reliability information indicating the reliability of the environmental map including the pair of left and right lane boundary lines of the traveling road recognized by the traveling road recognition unit, which is output by the output unit of the map reliability determination apparatus; and a request unit configured to output request information including a take-over request to an occupant based on the reliability indicated by the reliability information acquired by the reliability acquisition unit.

6. The driving assistance apparatus according to claim 5, wherein the traveling trajectory is a travel trajectory in a case where the subject vehicle travels again through a point included in the environmental map stored in the memory, and in a case where the subject vehicle travels in manual drive mode.

7. The driving assistance apparatus according to claim 5, wherein the output unit is configured to output the environmental map stored in the memory to a display by superimposing the reliability information including the determination result of the reliability.

8. The driving assistance apparatus according to claim 5, wherein the request unit is configured to output the request information when the reliability indicated by the reliability information acquired by the reliability acquisition unit is less than a predetermined degree.

9. The driving assistance apparatus according to claim 1, wherein the take-over request is a request for the occupant to place hands on a steering wheel.

10. The driving assistance apparatus according to claim 1, wherein the reliability is the reliability determined when the subject vehicle travels in advance, for the environmental map stored in the memory.

* * * * *